(12) United States Patent
Kulicki

(10) Patent No.: US 12,146,347 B2
(45) Date of Patent: Nov. 19, 2024

(54) LOW-PROFILE HANDLE ASSEMBLY

(71) Applicant: Volvo Car Corporation, Gothenburg (SE)

(72) Inventor: Piotr Kulicki, Lindome (SE)

(73) Assignee: Volvo Car Corporation, Gothenburg (SE)

( * ) Notice: Subject to any disclaimer, the term of this patent is extended or adjusted under 35 U.S.C. 154(b) by 579 days.

(21) Appl. No.: 16/693,615

(22) Filed: Nov. 25, 2019

(65) Prior Publication Data
US 2020/0332554 A1   Oct. 22, 2020

Related U.S. Application Data

(60) Provisional application No. 62/835,546, filed on Apr. 18, 2019.

(51) Int. Cl.
| | | |
|---|---|---|
| *E05B 7/00* | (2006.01) | |
| *B60R 7/04* | (2006.01) | |
| *E05B 5/00* | (2006.01) | |

(52) U.S. Cl.
CPC ............... *E05B 7/00* (2013.01); *B60R 7/04* (2013.01); *E05B 5/006* (2013.01)

(58) Field of Classification Search
CPC ... E05B 7/00; E05B 5/00; E05B 5/003; E05B 5/006; E05B 83/28; E05B 83/30;
(Continued)

(56) References Cited

U.S. PATENT DOCUMENTS 2,874,986 A * 2/1959 Henrichs ............... E05C 1/145
                                                      292/DIG. 31
7,823,937 B2 * 11/2010 Vitry .................... E05B 83/30
                                                      292/336.3
(Continued)

FOREIGN PATENT DOCUMENTS

| DE | 19537672 A1 * | 4/1997 | ............ E05C 3/24 |
| FR | 914606 A * | 10/1944 | ............ E05C 1/145 |

(Continued)

OTHER PUBLICATIONS

Annotated machine translation of DE 19537672 A1 (Year: 1997).*
(Continued)

*Primary Examiner* — Christine M Mills
*Assistant Examiner* — Peter H Watson
(74) *Attorney, Agent, or Firm* — Clements Bernard Walker; Devin Cummins

(57) ABSTRACT

A low-profile handle assembly adapted for use in a hatch cover of a storage compartment of a vehicle, the handle assembly including: a recessed housing including a top edge defining an opening; and a handle coupled to the recessed housing and disposed conformally within substantially the entirety of the opening defined by the top edge of the recessed housing; wherein the handle is adapted to pivot with respect to the recessed housing about a first pivot axis disposed at an intermediate longitudinal location along the recessed housing and the handle and about a second pivot axis disposed at an end longitudinal location along the recessed housing and the handle. The first pivot axis is formed by a translatable, extensible link assembly coupling the handle to the recessed housing.

2 Claims, 11 Drawing Sheets

(58) Field of Classification Search
CPC .......... E05B 83/32; E05B 85/10; E05B 85/14; E05B 85/16; E05B 85/103; E05B 85/107; E05B 1/0053; E05C 1/00; E05C 1/065; E05C 1/145; E05C 3/122; Y10T 292/57; Y10T 16/458; Y10T 16/462; Y10T 16/464; Y10T 16/473; Y10S 292/11; Y10S 292/31; B60R 7/04

See application file for complete search history.

(56) References Cited

U.S. PATENT DOCUMENTS

| | | | | |
|---|---|---|---|---|
| 2005/0023838 A1* | 2/2005 | Schlack | ............... | E05B 9/08 292/66 |
| 2015/0308151 A1* | 10/2015 | Minter | ............... | E05C 9/10 292/336.3 |
| 2015/0315811 A1* | 11/2015 | Mao | ............... | E05B 5/003 292/336.3 |
| 2016/0298366 A1* | 10/2016 | Och | ............... | E05B 85/103 |
| 2019/0218837 A1* | 7/2019 | Collins | ............... | B64D 29/06 |
| 2019/0390476 A1* | 12/2019 | Kightlinger | ............... | E05B 5/003 |

FOREIGN PATENT DOCUMENTS

| | | | | |
|---|---|---|---|---|
| FR | 3071861 A1 | | 4/2019 | |
| GB | 2180291 A | | 3/1987 | |
| GB | 2267116 A | * | 11/1993 | ........... E05B 85/107 |
| KR | 20120017739 A | * | 2/2012 | ............... B60R 7/06 |
| WO | 20160151131 A1 | | 9/2016 | |

OTHER PUBLICATIONS

Annotated machine translation of FR 914606 A (Year: 1944).*
Sep. 2, 2020 European Search Report issued on International Application No. 20164925.

* cited by examiner

LOW-PROFILE HANDLE ASSEMBLY

CROSS-REFERENCE TO RELATED APPLICATION

The present disclosure claims the benefit of priority of U.S. Provisional Patent Application No. 62/835,546, filed on Apr. 18, 2019, and entitled "LOW-PROFILE HANDLE ASSEMBLY," the contents of which are incorporated in full by reference herein.

TECHNICAL FIELD

The present disclosure relates generally to the automotive field. More particularly, the present disclosure relates to a low-profile handle assembly for a storage compartment of a vehicle.

BACKGROUND

A typical handle assembly for a storage compartment of a vehicle (e.g., a glove compartment, a driver-side storage compartment, a passenger storage compartment, a rear storage compartment, etc.) requires a relatively large packaging volume inside the associated hatch cover. Referring to FIG. 1, such a handle assembly 10 typically includes a pivoting handle 12 that is disposed within a recessed housing 14 formed within the hatch cover 16. The relatively large packaging volume is driven by ergonomic factors, including: the ease of use (i.e., the necessary access space 15 for a user's fingers to comfortably grab an edge of the handle 12) and the required limited operating forces (i.e., the necessary mechanical leverage ratio to actuate the handle 12). These ergonomic factors typically result in increased thickness of the hatch cover 16 in the handle area and a large visible recess 15 in the outer hatch cover 16 next to the grab edge of the handle 12. This typically has a negative impact on the interior storage volume of the storage compartment, accessibility and functionality, and the appearance of the hatch cover 16. Although not of particular consequence here, the typical handle assembly 10 includes a pivoting mechanism 18 coupled to the handle 12, as well as to an actuation mechanism 20 that selectively engages/disengages the hatch cover 16 to/from the storage compartment, mechanically and/or electronically. All components are manufactured from a substantially-rigid plastic, metallic, or like material.

As is shown, the shape of the recessed housing 14 is typically made to substantially conform with the shape of the handle 12, and smooth, unobtrusive lines are utilized for both in order to enhance the appearance of the handle assembly 10 and hatch cover 16, given the relatively large packaging volume. What is still needed in the art, however, is a handle assembly that minimizes this packaging volume, maximizing interior storage compartment volume, and enhances handle assembly and hatch cover appearance further by eliminating visible recess finger grab area.

SUMMARY

In various exemplary embodiments, the present disclosure provides a low-profile handle assembly that minimizes the depth of the handle and recessed housing and eliminates the need for a thick hatch cover in the handle area, requiring no visible recess for the user's fingers next to the handle. The handle sits flush with the hatch cover surface, with only a small gap around the moving handle. This provides a clean and simple appearance of the handle and hatch cover as a whole. Further, depending on the size and geometry of the handle, it is possible to achieve the same or better leverage as compared to conventional solutions.

In one exemplary embodiment, the present disclosure provides a low-profile handle assembly adapted for use in a hatch cover of a storage compartment of a vehicle, the handle assembly including: a recessed housing including a top edge defining an opening; and a handle coupled to the recessed housing and disposed conformally within substantially the entirety of the opening defined by the top edge of the recessed housing; wherein the handle is adapted to pivot with respect to the recessed housing about a first pivot axis disposed at an intermediate longitudinal location along the recessed housing and the handle and about a second pivot axis disposed at an end longitudinal location along the recessed housing and the handle. The first pivot axis is formed by a translatable, extensible link assembly coupling the handle to the recessed housing. The link assembly includes: an intermediate link pivotably coupled to the handle; and a slider pivotably coupled to the intermediate link and translatably coupled to the recessed housing; wherein the intermediate link and the slider collectively enable the handle to pivot within the opening defined by the top edge of the recessed housing when one end of the handle is pushed into the recessed housing by a user and an opposite end of the handle is pulled out of the recessed housing by the user while the slider translates with respect to the recessed housing. The handle assembly further includes a hinge pin pivotably coupling the handle to the intermediate link and a hinge pin pivotably coupling the intermediate link to the slider. The handle further includes a spring disposed about the hinge pin pivotably coupling the handle to the intermediate link and adapted to bias the handle towards the link assembly. The handle assembly of claim further includes a buffer member disposed between the handle and the intermediate link. The handle is further pivotably coupled to the recessed housing via a pivot structure coupled to the one end of the handle and adapted to be received within a slot structure defined by the recessed housing, thereby allowing the one end of the handle to translate into the recessed housing and forming the second pivot axis.

In another exemplary embodiment, the present disclosure provides a hatch cover assembly for a storage compartment of a vehicle, the hatch cover assembly including: a hatch cover having an exterior surface; and a low-profile handle assembly disposed within the hatch cover, wherein the handle assembly includes: a recessed housing including a top edge defining an opening, wherein the top edge of the recessed housing sits substantially flush with the exterior surface of the hatch cover; and a handle coupled to the recessed housing and disposed conformally within substantially the entirety of the opening defined by the top edge of the recessed housing; wherein the handle is adapted to pivot with respect to the recessed housing about a first pivot axis disposed at an intermediate longitudinal location along the recessed housing and the handle and about a second pivot axis disposed at an end longitudinal location along the recessed housing and the handle. The first pivot axis is formed by a translatable, extensible link assembly coupling the handle to the recessed housing. The link assembly includes: an intermediate link pivotably coupled to the handle; and a slider pivotably coupled to the intermediate link and translatably coupled to the recessed housing; wherein the intermediate link and the slider collectively enable the handle to pivot within the opening defined by the top edge of the recessed housing when one end of the handle is pushed into the recessed housing by a user and an opposite end of the handle is pulled out of the recessed housing by the user while the slider translates with respect to the recessed housing. The hatch cover assembly further includes a hinge pin pivotably coupling the handle to the intermediate link and a hinge pin pivotably coupling the intermediate link to the slider. The hatch cover assembly further includes a spring disposed about the hinge pin pivotably coupling the handle to the intermediate link and adapted to bias the handle towards the link assembly. The hatch cover assembly further includes a buffer member disposed between the handle and the intermediate link. The handle is further pivotably coupled to the recessed housing via a pivot structure coupled to the one end of the handle and adapted to be received within a slot structure defined by the recessed housing, thereby allowing the one end of the handle to translate into the recessed housing and forming the second pivot axis.

In a further exemplary embodiment, the present disclosure provides a storage compartment assembly for a vehicle, the storage compartment assembly including: a storage compartment adapted to be coupled to a structure of the vehicle; a hatch cover having an exterior surface pivotably coupled to the storage compartment; and a low-profile handle assembly disposed within the hatch cover, wherein the handle assembly includes: a recessed housing including a top edge defining an opening, wherein the top edge of the recessed housing sits substantially flush with the exterior surface of the hatch cover; and a handle coupled to the recessed housing and disposed conformally within substantially the entirety of the opening defined by the top edge of the recessed housing; wherein the handle is adapted to pivot with respect to the recessed housing about a first pivot axis disposed at an intermediate longitudinal location along the recessed housing and the handle and about a second pivot axis disposed at an end longitudinal location along the recessed housing and the handle. The first pivot axis is formed by a translatable, extensible link assembly coupling the handle to the recessed housing, wherein the link assembly includes: an intermediate link pivotably coupled to the handle; and a slider pivotably coupled to the intermediate link and translatably coupled to the recessed housing; wherein the intermediate link and the slider collectively enable the handle to pivot within the opening defined by the top edge of the recessed housing when one end of the handle is pushed into the recessed housing by a user and an opposite end of the handle is pulled out of the recessed housing by the user while the slider translates with respect to the recessed housing. The storage compartment assembly further includes a hinge pin pivotably coupling the handle to the intermediate link and a hinge pin pivotably coupling the intermediate link to the slider. The storage compartment assembly further includes a spring disposed about the hinge pin pivotably coupling the handle to the intermediate link and adapted to bias the handle towards the link assembly. The storage compartment assembly further includes a buffer member disposed between the handle and the intermediate link. The handle is further pivotably coupled to the recessed housing via a pivot structure coupled to the one end of the handle and adapted to be received within a slot structure defined by the recessed housing, thereby allowing the one end of the handle to translate into the recessed housing and forming the second pivot axis.

BRIEF DESCRIPTION OF THE DRAWINGS

The present disclosure is illustrated and described with reference to the various drawings, in which like reference numbers are used to denote like assembly components/method steps, as appropriate, and in which.

DESCRIPTION OF EMBODIMENTS

Again, in various exemplary embodiments, the present disclosure provides a low-profile handle assembly that minimizes the depth of the handle and recessed housing and eliminates the need for a thick hatch cover in the handle area, requiring no visible recess for the user's fingers next to the handle. The handle sits flush with the hatch cover surface, with only a small gap around the moving handle. This provides a clean and simple appearance of the handle and hatch cover as a whole. Further, depending on the size and geometry of the handle, it is possible to achieve the same or better leverage as compared to conventional solutions.

Figure 1:
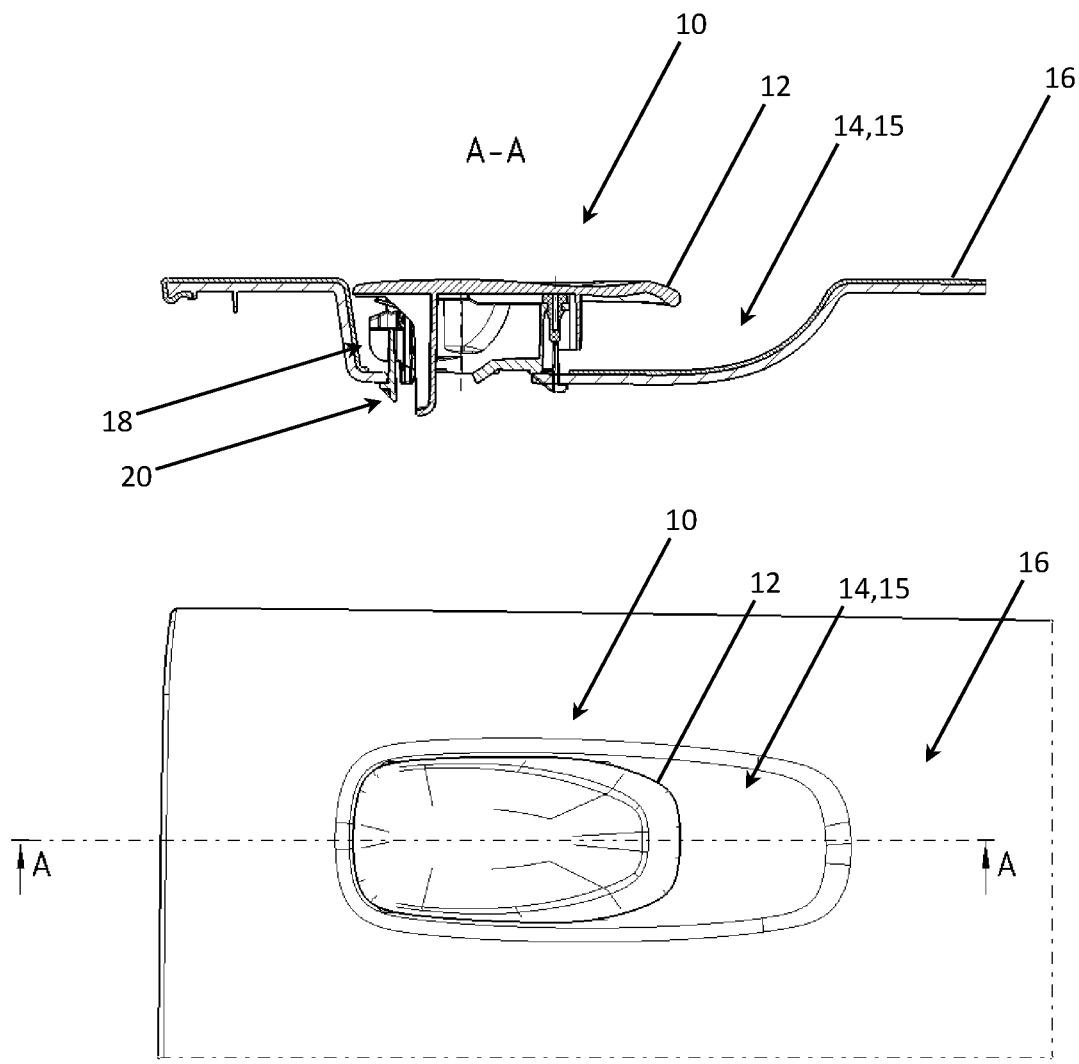
FIG. 1 is a cross-sectional side view and a top planar view of a conventional handle assembly for a storage compartment of a vehicle.
Figure 2:
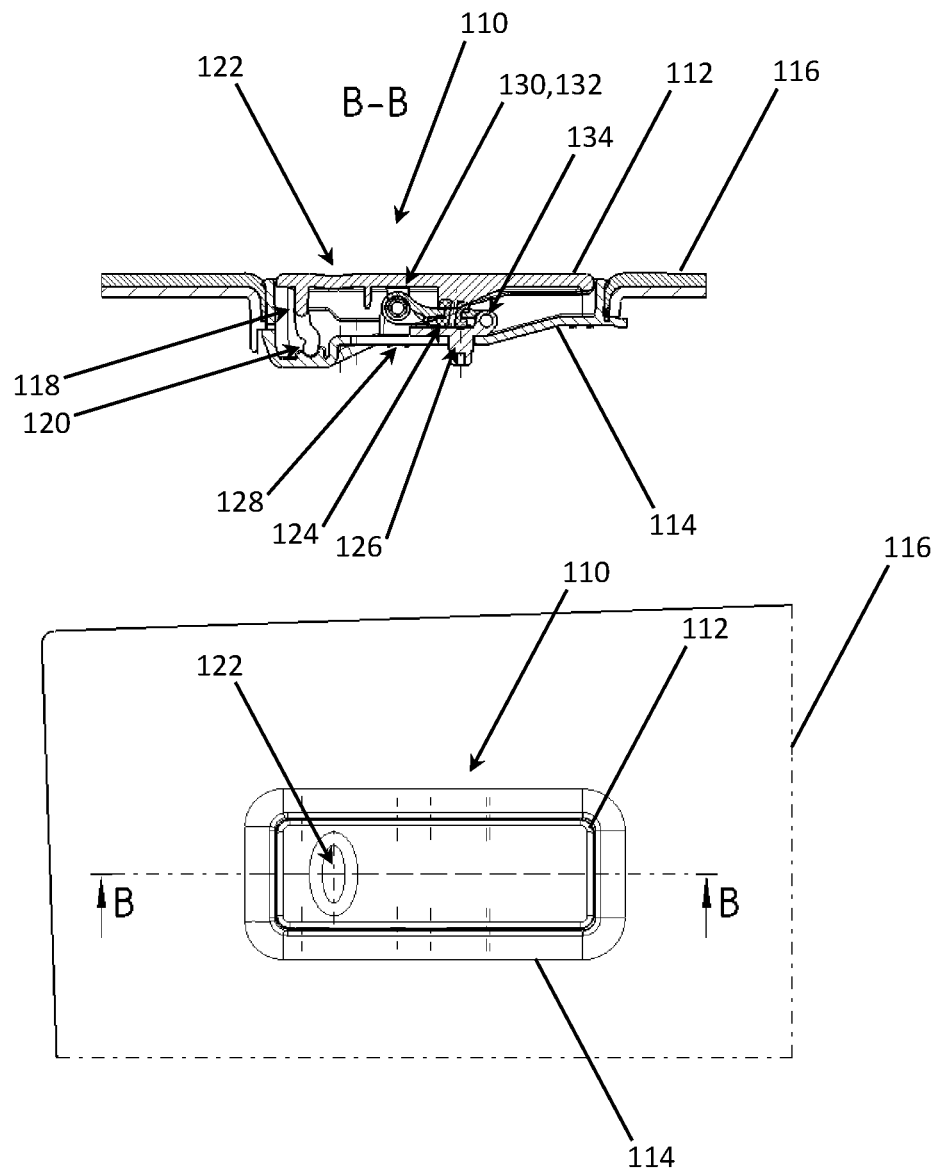
FIG. 2 is a cross-sectional side view and a top planar view of one exemplary embodiment the low-profile handle assembly for a storage compartment of a vehicle of the present disclosure.

Referring now specifically to FIG. 2, in one exemplary embodiment, the low-profile handle assembly 110 of the present disclosure includes a handle 112 that is pivotably disposed within and coupled to a recessed housing 114 that is adapted to be disposed within and coupled to an outer surface of a hatch cover 116 used to selectively open/close an associated storage compartment of a vehicle. Specifically, the inner side of one end of the handle 112 includes a pivot axis including protruding pivot points 118 that is/are coupled to or integrally formed with the handle 112 and engage corresponding slots 120 manufactured into the sides of the deeper end of the recessed housing 114, as shown. These slots 120 allow the pivot axis/protruding pivot points 118 and the end of the handle 112 to be depressed and translate vertically into the recessed housing 114 before the pivot axis/protruding pivot points 118 bottom out within deflected ends of the slots 120, at which point the handle 112 purely pivots within the recessed housing 114. A visible finger depression area 122 may be manufactured into the outer surface of the handle 112 adjacent to the pivot axis/protruding pivot points 118, indicating to a user where to press the handle 112 to translate it vertically into the recessed housing 114. As described in greater detail herein below, this actuation causes and opposite end of the handle 112 to pivot out of the recessed housing 114 and be exposed, such that the opposite end of the handle 112 can then be grabbed by the user and further pivoted away from the recessed housing 114 with a pulling motion, which ultimately actuates the latch mechanism of the storage compartment. Thus, the handle 112 is pivotably coupled to the recessed housing 114, in part, via the pivot axis/protruding pivot points 118 coupled to the inner side of one end of the handle 112 and configured to be received within the slots 120 defined by the recessed housing 114. The recessed housing 114 is configured to be disposed within and coupled to the associated hatch cover 116, with both the handle 112 and a top edge of the recessed housing 114 sitting flush with an exterior surface of the hatch cover 116. Again, all components are manufactured from a substantially-rigid plastic, metallic, or like material.

An intermediate portion of the handle 112 is also pivotably and translatably coupled to the recessed housing 112 via an intermediate link 124 and a slider 126, which form a link assembly 128 that also allows the handle 112 to pivot with respect to the recessed housing 114 as the slider 126 translates with respect to the recessed housing 114, the intermediate link 124 pivots with respect to the slider 126, the link assembly 128 is extended, and the handle 112 pivots with respects to the intermediate link 124. Accordingly, the intermediate link 124 is pivotably coupled to both the handle 112 and the slider 126, while the slider 126 is translatably coupled to the recessed housing 114 via a track structure that forms a portion of the slider 126 and a pair of corresponding longitudinal recesses manufactured into the intermediate bottom interior portion of the recessed housing 114. Again, the interplay of this track structure and these longitudinal recesses allows the slider 126 to translate along a longitudinal axis of the recessed housing 114. This longitudinal axis connects the push area and the pull area of the handle 112 along its central axis. Again, the intermediate link 124 is permitted to pivot with respect to the slider 126 as the slider 126 translates with respect to the recessed housing 114, and the handle 112 is permitted to pivot with respect to both the intermediate link 124 and the slider 126 as the slider 126 translates with respect to the recessed housing 114. The link assembly 128 forms a translation, pivoting, and actuation mechanism that is disposed within the recessed housing 114 under the handle 112, allowing the handle 112 to sit flush with the exterior surface of the hatch cover 116.

The intermediate link 124 is biased towards the slider 126 by a spring 130 that causes the intermediate link 124 to preferentially nest against the slider 126, and the handle 112 to preferentially nest against the intermediate link 124 and within the recessed housing 114 unless a push/pull force is applied to the handle 112 by the user. Accordingly, a hinge pin 132 or the like is used to pivotably couple the handle 112 to the intermediate link 124 and a hinge pin 134 or the like is used to pivotably couple the intermediate link 124 to the slider 126, with the hinge pin 132 passing through the spring 130.

Finally, a buffer member may be provided between the handle 112 and the intermediate link 124, such that the two components do not rub or bind. It will be readily apparent to those of ordinary skill in the art that all of the above components may be manufactured from a metallic material, a polymeric material, or another suitable rigid material, while the buffer member may be manufactured from an elastomeric material.

Figure 3:
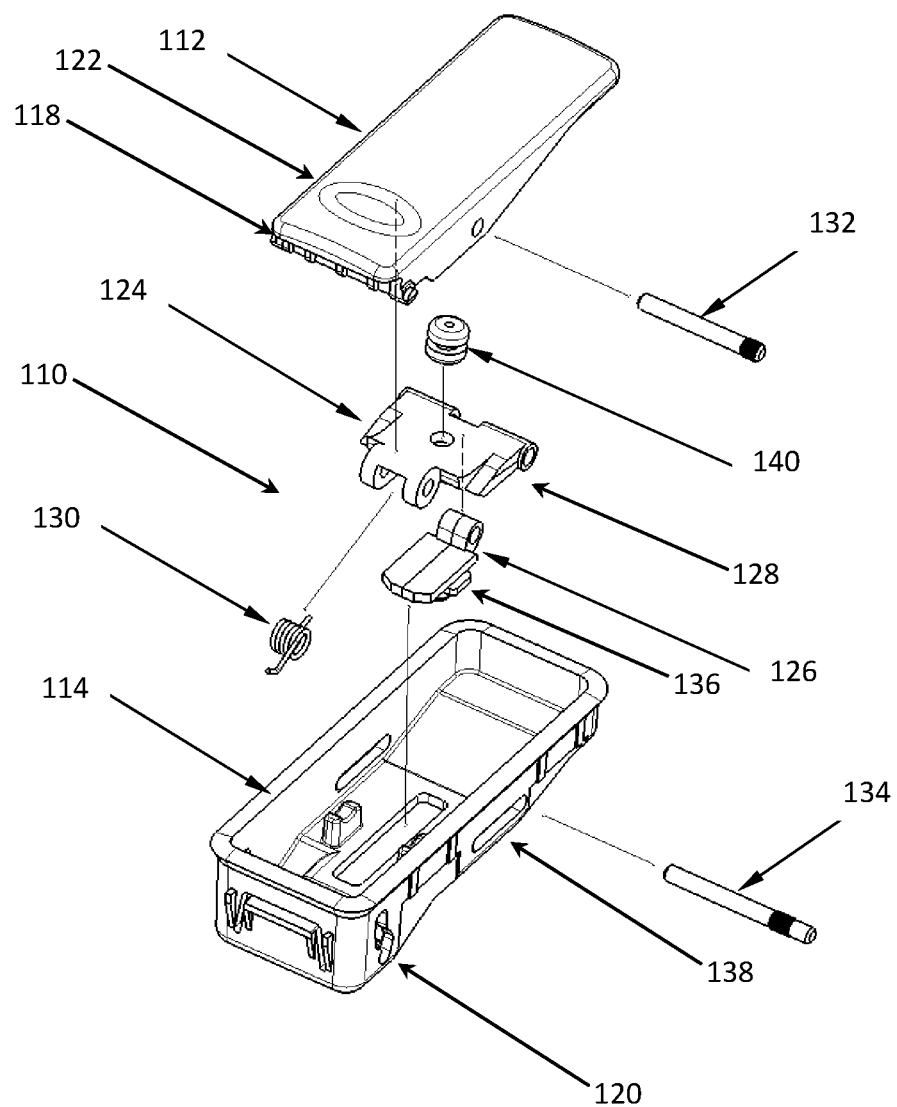
FIG. 3 is an exploded perspective view of one exemplary embodiment of the low-profile handle assembly for a storage compartment of a vehicle of the present disclosure.

Referring now specifically to FIG. 3, in one exemplary embodiment, the low-profile handle assembly 110 of the present disclosure again includes a handle 112 that is pivotably disposed within and coupled to a recessed housing 114 that is adapted to be disposed within and coupled to an outer surface of a hatch cover 116 (FIG. 2) used to selectively open/close an associated storage compartment of a vehicle. Specifically, the inner side of one end of the handle 112 includes a pivot axis including protruding pivot points 118 that is/are coupled to or integrally formed with the handle 112 and engage corresponding slots 120 manufactured into the sides of the deeper end of the recessed housing 114, as shown. These slots 120 allow the pivot axis/protruding pivot points 118 and the end of the handle 112 to be depressed and translate vertically into the recessed housing 114 before the pivot axis/protruding pivot points 118 bottom out within deflected ends of the slots 120, at which point the handle 112 purely pivots within the recessed housing 114. A visible finger depression area 122 may be manufactured into the outer surface of the handle 112 adjacent to the pivot axis/protruding pivot points 118, indicating to a user where to press the handle 112 to translate it vertically into the recessed housing 114. As described in greater detail herein below, this actuation causes and opposite end of the handle 112 to pivot out of the recessed housing 114 and be exposed, such that the opposite end of the handle 112 can then be grabbed by the user and further pivoted away from the recessed housing 114 with a pulling motion, which ultimately actuates the latch mechanism of the storage compartment. Thus, the handle 112 is pivotably coupled to the recessed housing 114, in part, via the pivot axis/protruding pivot points 118 coupled to the inner side of one end of the handle 112 and configured to be received within the slots 120 defined by the recessed housing 114. The recessed housing 114 is configured to be disposed within and coupled to the associated hatch cover 116, with both the handle 112 and a top edge of the recessed housing 114 sitting flush with an exterior surface of the hatch cover 116. Again, all components are manufactured from a substantially-rigid plastic, metallic, or like material.

An intermediate portion of the handle 112 is also pivotably and translatably coupled to the recessed housing 112 via an intermediate link 124 and a slider 126, which form a link assembly 128 that also allows the handle 112 to pivot with respect to the recessed housing 114 as the slider 126 translates with respect to the recessed housing 114, the intermediate link 124 pivots with respect to the slider 126, the link assembly 128 is extended, and the handle 112 pivots with respects to the intermediate link 124. Accordingly, the intermediate link 124 is pivotably coupled to both the handle 112 and the slider 126, while the slider 126 is translatably coupled to the recessed housing 114 via a track structure 136 that forms a portion of the slider 126 and a pair of corresponding longitudinal recesses 138 manufactured into the intermediate bottom interior portion of the recessed housing 114. Again, the interplay of this track structure 136 and these longitudinal recesses 138 allows the slider 126 to translate along a longitudinal axis of the recessed housing 114. This longitudinal axis connects the push area and the pull area of the handle 112 along its central axis. Again, the intermediate link 124 is permitted to pivot with respect to the slider 126 as the slider 126 translates with respect to the recessed housing 114, and the handle 112 is permitted to pivot with respect to both the intermediate link 124 and the slider 126 as the slider 126 translates with respect to the recessed housing 114. The link assembly 128 forms a translation, pivoting, and actuation mechanism that is disposed within the recessed housing 114 under the handle 112, allowing the handle 112 to sit flush with the exterior surface of the hatch cover 116.

The intermediate link 124 is biased towards the handle 112 by a spring 130 that causes the intermediate link 124 to preferentially nest against the handle 112, and the intermediate link 124 to preferentially nest against the slider 126 and within the recessed housing 114 unless a push/pull force is applied to the handle 112 by the user. Accordingly, a hinge pin 132 or the like is used to pivotably couple the handle 112 to the intermediate link 124, with the hinge pin 132 passing through the spring 130. The hinge pin 132 passes through holes or bores manufactured into the intermediate portion of the handle 112 and an end portion of the intermediate link 124. A hinge pin 134 or the like is also used to pivotably couple the intermediate link 124 to the slider 126. The hinge pin 134 passes through holes or bores manufactured into an opposite end portion of the intermediate link 124 and an end portion of the slider 126. Thus, the link assembly 128 forms a pivotably extensible structure that translates with respect to the recessed housing 114 and with respect to which the handle 112 may be pivoted.

Finally, a buffer member 140 may be provided between the handle 112 and the intermediate link 124, such that the two components do not rub or bind. It will be readily apparent to those of ordinary skill in the art that all of the above components may be manufactured from a metallic material, a polymeric material, or another suitable rigid material, while the buffer member 140 may be manufactured from an elastomeric material.

Figure 4:
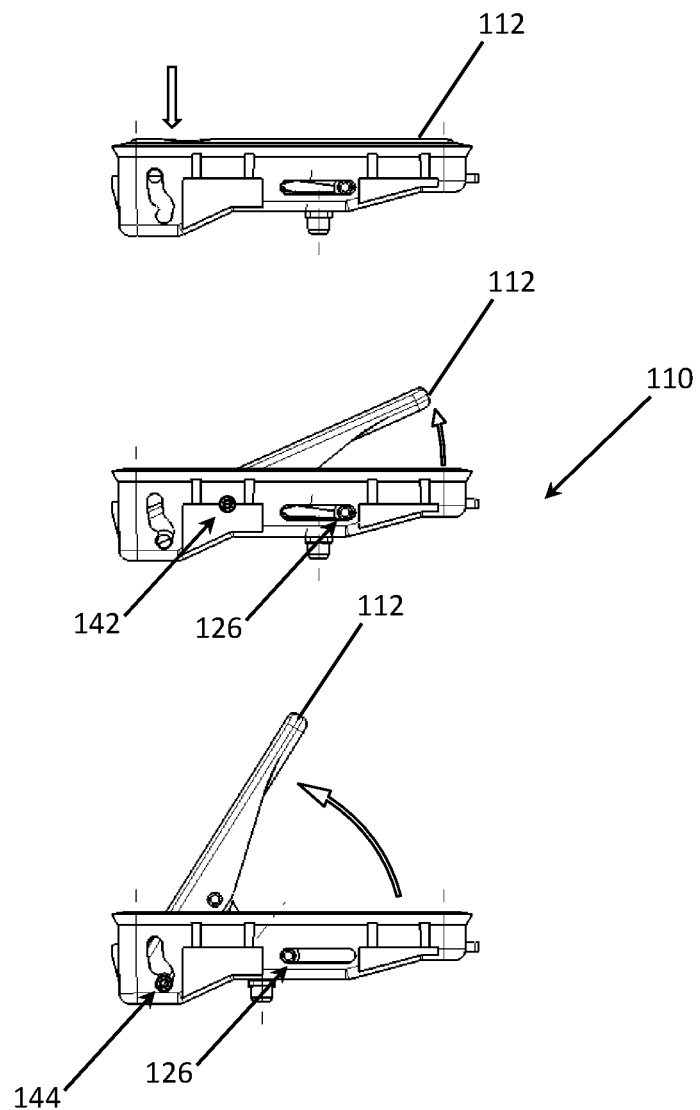
FIG. 4 is a series of side planar views of one exemplary embodiment the low-profile handle assembly for a storage compartment of a vehicle of the present disclosure in various states of actuation.

Referring now specifically to FIG. 4, in one exemplary embodiment, the low-profile handle assembly 110 of the present disclosure is enabled by the complex movement of the handle 112, consisting of two sequential rotational movements. The fulcrum line for the handle movement is translated between the first and second phases of movement. The first rotational movement is initiated by the user pushing on the end of the handle 112 opposite the grab edge. The handle 112 rotates about an axis 142 located near the middle of the handle assembly 110. This lifts the grab edge sufficiently for the user to place his or her finger(s) under it. The second rotational movement is performed by pulling the grab edge. This rotation is around another axis 144 located near the end of the handle 112 opposite the grab edge. Here, the actuating movement for the associated latch assembly is the displacement of the slider 126.

By reducing the packaging volume needed for the handle assembly, the thickness of the hatch cover may be reduced. This increases the available storage compartment volume and accessibility. As a result, the functionality of the storage compartment is improved. Removing the recess needed for the user's fingers reduces the visual size of the handle assembly and enables an overall clean design. This provides a modern appearance and improves the premium impression of the vehicle interior.

Figure 5:
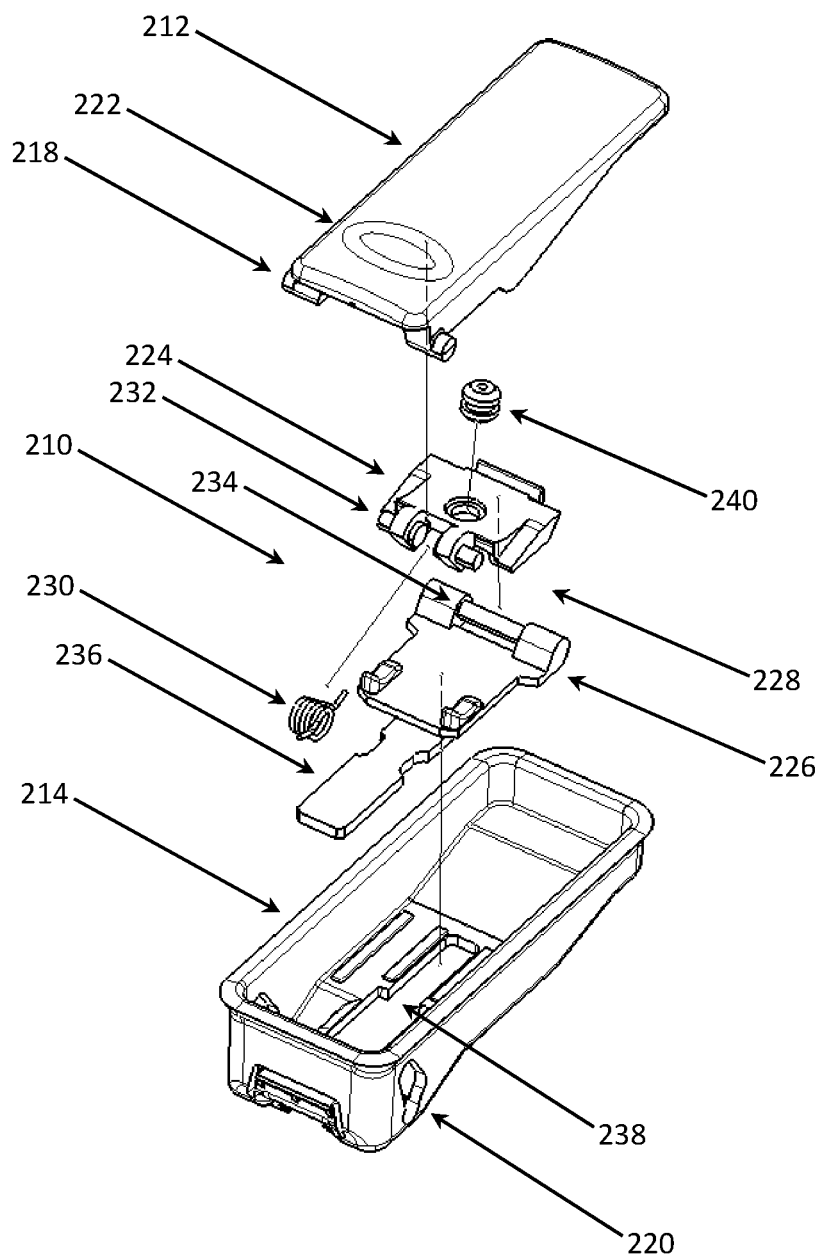
FIG. 5 is an exploded perspective view of another exemplary embodiment of the low-profile handle assembly for a storage compartment of a vehicle of the present disclosure.

Referring now specifically to FIG. 5, in another exemplary embodiment, the low-profile handle assembly 210 of the present disclosure again includes a handle 212 that is pivotably disposed within and coupled to a recessed housing 214 that is adapted to be disposed within and coupled to an outer surface of a hatch cover 116 (FIG. 2) used to selectively open/close an associated storage compartment of a vehicle. Specifically, the inner side of one end of the handle 212 includes a pivot axis including protruding pivot points 218 that is/are coupled to or integrally formed with the handle 212 and engage corresponding slots 220 manufactured into the sides of the deeper end of the recessed housing 214, as shown. These slots 220 allow the pivot axis/protruding pivot points 218 and the end of the handle 212 to be depressed and translate vertically into the recessed housing 214 before the pivot axis/protruding pivot points 218 bottom out within deflected ends of the slots 220, at which point the handle 212 purely pivots within the recessed housing 214. A visible finger depression area 222 may be manufactured into the outer surface of the handle 212 adjacent to the pivot axis/protruding pivot points 218, indicating to a user where to press the handle 212 to translate it vertically into the recessed housing 214. As described in greater detail herein below, this actuation causes and opposite end of the handle 212 to pivot out of the recessed housing 214 and be exposed, such that the opposite end of the handle 212 can then be grabbed by the user and further pivoted away from the recessed housing 214 with a pulling motion, which ultimately actuates the latch mechanism of the storage compartment. Thus, the handle 212 is pivotably coupled to the recessed housing 214, in part, via the pivot axis/protruding pivot points 218 coupled to the inner side of one end of the handle 212 and configured to be received within the slots 220 defined by the recessed housing 214. The recessed housing 214 is configured to be disposed within and coupled to the associated hatch cover 116, with both the handle 212 and a top edge of the recessed housing 214 sitting flush with an exterior surface of the hatch cover 116. Again, all components are manufactured from a substantially-rigid plastic, metallic, or like material.

An intermediate portion of the handle 212 is also pivotably and translatably coupled to the recessed housing 214 via an intermediate link 224 and a slider 226, which form a link assembly 228 that also allows the handle 212 to pivot with respect to the recessed housing 214 as the slider 226 translates with respect to the recessed housing 214, the intermediate link 224 pivots with respect to the slider 226, the link assembly 228 is extended, and the handle 212 pivots with respects to the intermediate link 224. Accordingly, the intermediate link 224 is pivotably coupled to both the handle 212 and the slider 226, while the slider 226 is translatably coupled to the recessed housing 214 via a track structure 236 that forms a portion of the slider 226 and a bottom recess 238 manufactured into the intermediate bottom interior portion of the recessed housing 214. Again, the interplay of this track structure 236 and the bottom recess 238 allows the slider 226 to translate along a longitudinal axis of the recessed housing 214. This longitudinal axis connects the push area and the pull area of the handle 212 along its central axis. Again, the intermediate link 224 is permitted to pivot with respect to the slider 226 as the slider 226 translates with respect to the recessed housing 214, and the handle 212 is permitted to pivot with respect to both the intermediate link 224 and the slider 226 as the slider 226 translates with respect to the recessed housing 214. The link assembly 228 forms a translation, pivoting, and actuation mechanism that is disposed within the recessed housing 214 under the handle 212, allowing the handle 212 to sit flush with the exterior surface of the hatch cover 116.

The intermediate link 224 is biased towards the handle 212 by a spring 230 that causes the intermediate link 224 to preferentially nest against the handle 212, and the intermediate link 224 to preferentially nest against the slider 226 and within the recessed housing 214 unless a push/pull force is applied to the handle 212 by the user. Accordingly, protruding hinge pins 232 or the like coupled to or integrally formed with the intermediate link 224 are used to pivotably couple the handle 212 to the intermediate link 224, with the protruding hinge pins 232 retained within holes or bores manufactured into the intermediate portion of the handle 212. Protrusions integrally formed with the intermediate link 224 in the center of the intermediate link 224 and aligned coaxially with the protruding hinge pins 232 are disposed within the coil(s) of the spring 230 and used to retain the spring 230. A hinge pin 234 coupled to or integrally formed with the slider 226 is also used to pivotably couple the intermediate link 224 to the slider 226. A hook structure on the intermediate link 224 is "snapped" onto the hinge pin 234 of the slider 226 to pivotably couple the two components together. Thus, the link assembly 228 forms a pivotably extensible structure that translates with respect to the recessed housing 214 and with respect to which the handle 212 may be pivoted.

Finally, a buffer member 240 may be provided between the handle 212 and the intermediate link 224, such that the two components do not rub or bind. It will be readily apparent to those of ordinary skill in the art that all of the above components may be manufactured from a metallic material, a polymeric material, or another suitable rigid material, while the buffer member 240 may be manufactured from an elastomeric material.

Referring now specifically to FIGS. 6 and 7, again, the intermediate portion of the handle 212 (FIG. 5) is pivotably and translatably coupled to the recessed housing 214 via the intermediate link 224 (FIG. 5) and the slider 226, which form the link assembly 228 (FIG. 5) that allows the handle 212 to pivot with respect to the recessed housing 214 as the slider 226 translates with respect to the recessed housing 214, the intermediate link 224 pivots with respect to the slider 226, the link assembly 228 is extended, and the handle 212 pivots with respects to the intermediate link 224. Accordingly, the intermediate link 224 is pivotably coupled to both the handle 212 and the slider 226, while the slider 226 is translatably coupled to the recessed housing 214 via the track structure 236 that forms a portion of the slider 226 and the bottom recess 238 manufactured into the intermediate bottom interior portion of the recessed housing 214. Again, the interplay of this track structure 236 and the bottom recess 238 allows the slider 226 to translate along a longitudinal axis of the recessed housing 214. This longitudinal axis connects the push area and the pull area of the handle 212 along its central axis. Again, the intermediate link 224 is permitted to pivot with respect to the slider 226 as the slider 226 translates with respect to the recessed housing 214, and the handle 212 is permitted to pivot with respect to both the intermediate link 224 and the slider 226 as the slider 226 translates with respect to the recessed housing 214. The link assembly 228 forms a translation, pivoting, and actuation mechanism that is disposed within the recessed housing 214 under the handle 212, allowing the handle 212 to sit flush with the exterior surface of the hatch cover 116 (FIG. 2). Here, the track structure 236 is slotted or keyed such that it is translatably retained within the bottom recess 238.

Referring now specifically to FIG. 8, again, the intermediate portion of the handle 212 (FIG. 5) is pivotably and translatably coupled to the recessed housing 214 (FIGS. 5-7) via the intermediate link 224 and the slider 226, which form the link assembly 228 (FIG. 5) that allows the handle 212 to pivot with respect to the recessed housing 214 as the slider 226 translates with respect to the recessed housing 214, the intermediate link 224 pivots with respect to the slider 226, the link assembly 228 is extended, and the handle 212 pivots with respects to the intermediate link 224. Accordingly, the intermediate link 224 is pivotably coupled to both the handle 212 and the slider 226, while the slider 226 is translatably coupled to the recessed housing 214 via the track structure 236 (FIGS. 6 and 7) that forms a portion of the slider 226 and the bottom recess 238 (FIGS. 6 and 7) manufactured into the intermediate bottom interior portion of the recessed housing 214. Again, the interplay of this track structure 236 and the bottom recess 238 allows the slider 226 to translate along a longitudinal axis of the recessed housing 214. This longitudinal axis connects the push area and the pull area of the handle 212 along its central axis. Again, the intermediate link 224 is permitted to pivot with respect to the slider 226 as the slider 226 translates with respect to the recessed housing 214, and the handle 212 is permitted to pivot with respect to both the intermediate link 224 and the slider 226 as the slider 226 translates with respect to the recessed housing 214. The link assembly 228 forms a translation, pivoting, and actuation mechanism that is disposed within the recessed housing 214 under the handle 212, allowing the handle 212 to sit flush with the exterior surface of the hatch cover 116 (FIG. 2). A hook structure 242 is provided on the intermediate link 224 and is "snapped" onto the hinge pin 234 of the slider 226 to pivotably couple the two components together.

Figure 9:
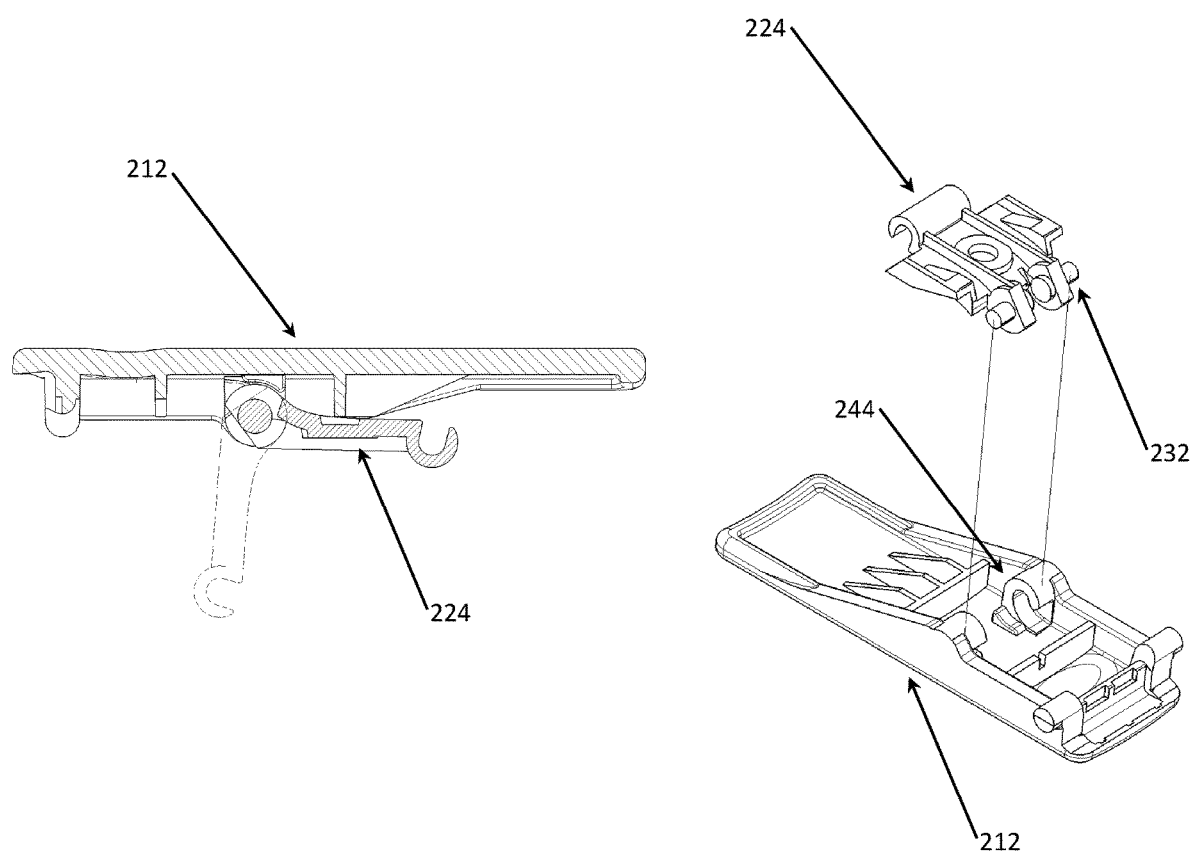
FIG. 9 is another cross-sectional side view and an exploded perspective view of one exemplary embodiment of the handle pivoting/extension mechanism of the low-profile handle assembly of the present disclosure.

FIG. 9 further illustrates the pivoting connection between the handle 212 and the intermediate link 224. The protruding hinge pins 232 disposed on either side of the intermediate link 224 are retained within molded retention holes 244 disposed within either side of the handle 212, again with a "snapping" engagement or the like. Thus, the handle 212 can pivot with respect to the intermediate link 224, which forms a portion of the extensible link 228 (FIG. 5).

Figure 6:
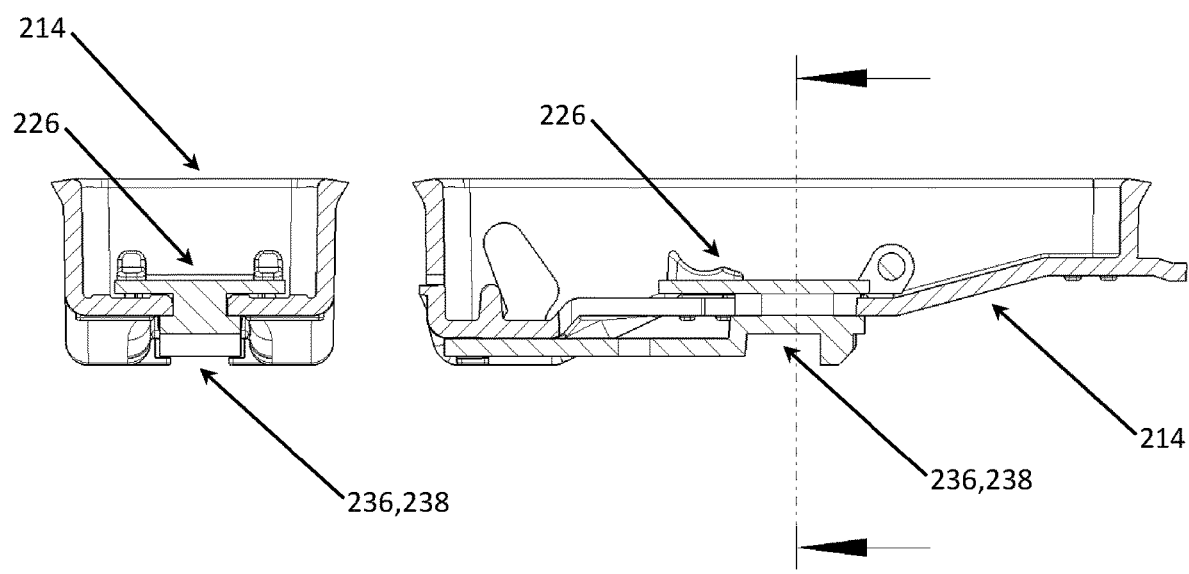
FIG. 6 is a cross-sectional side view of one exemplary embodiment of the handle slider mechanism of the low-profile handle assembly of the present disclosure.
Figure 7:
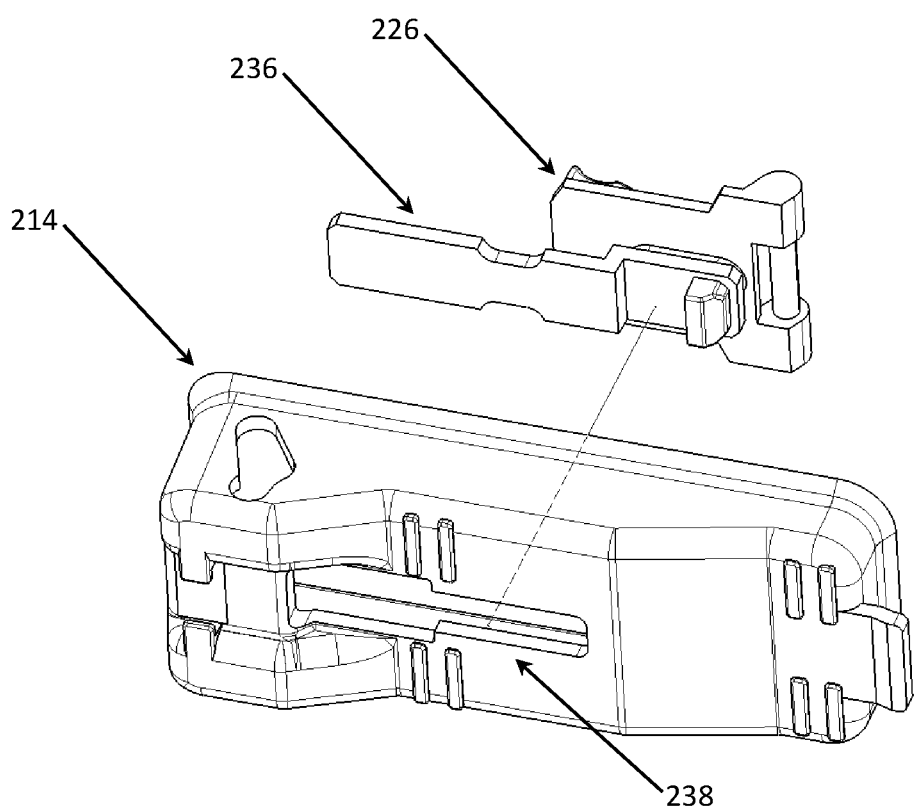
FIG. 7 is an exploded perspective view of one exemplary embodiment of the handle slider mechanism of the low-profile handle assembly of the present disclosure.
Figure 8:
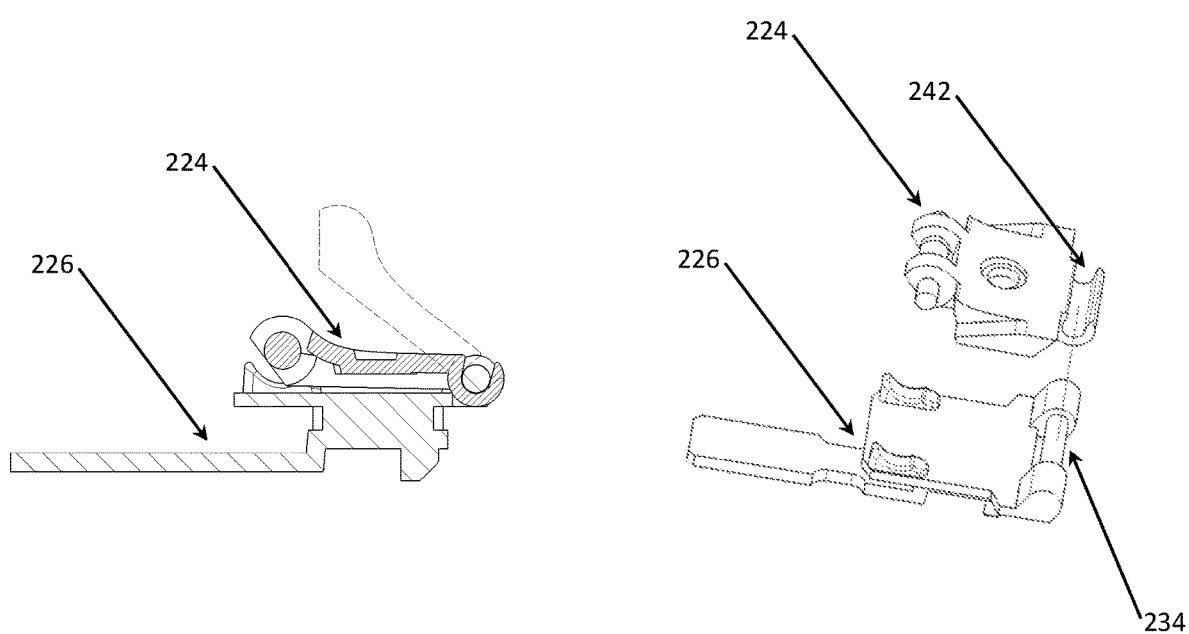
FIG. 8 is a cross-sectional side view and an exploded perspective view of one exemplary embodiment of the handle pivoting/extension mechanism of the low-profile handle assembly of the present disclosure.
Figure 10:
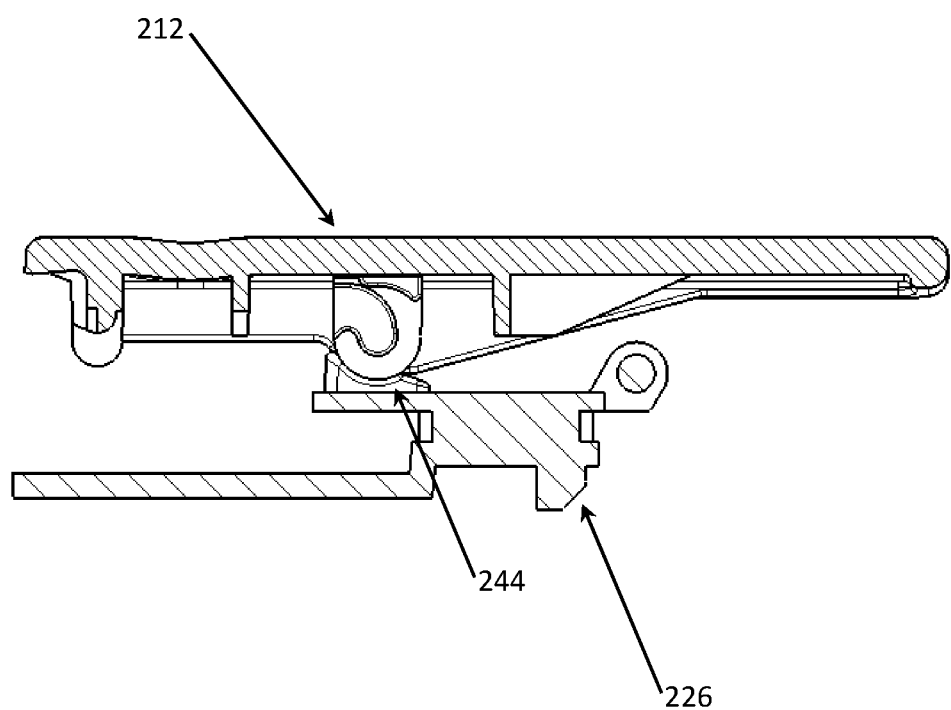
FIG. 10 is a further cross-sectional side view of one exemplary embodiment of the handle pivoting/extension mechanism of the low-profile handle assembly of the present disclosure, highlighting the manner in which the associated slider supports the handle when the handle is disposed in a non-actuated position.

FIG. 10 is a further cross-sectional side view of one exemplary embodiment of the handle pivoting/extension mechanism of the low-profile handle assembly 210 (FIG. 5) of the present disclosure, highlighting the manner in which the associated slider 226 supports the handle 212 when the handle 212 is disposed in a non-actuated position. Specifically, the retention hole structures 244 are supported on the slider 226. Although this support is redundant, and optional, it provides enhanced functionality when the handle 212 is depressed into the housing 214 (FIGS. 5-7).

Figure 11:
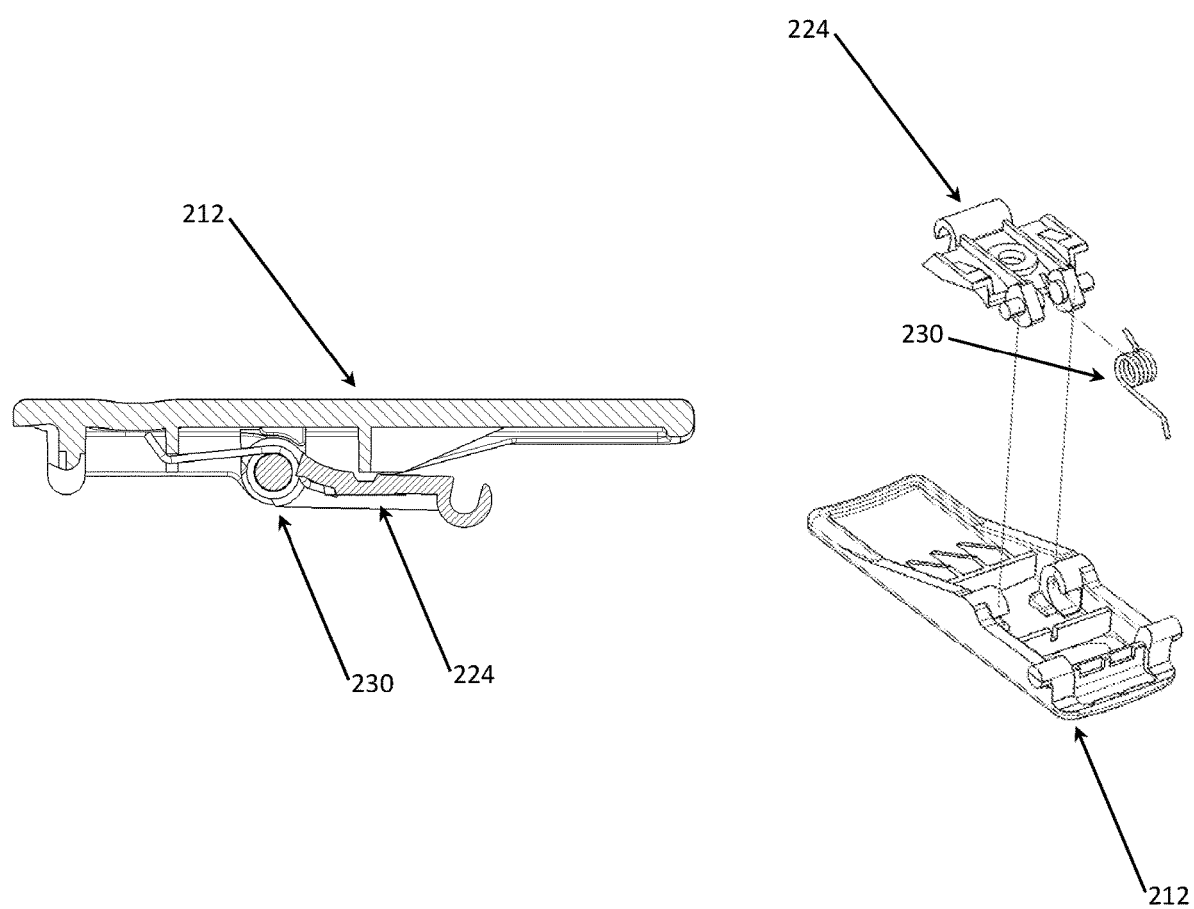
FIG. 11 is a further cross-sectional side view and an exploded perspective view of one exemplary embodiment of the handle pivoting/extension mechanism of the low-profile handle assembly of the present disclosure, highlighting the operation of the intervening biasing spring.

FIG. 11 illustrates the operation of the biasing spring 230 that couples the handle 212 to the intermediate link 224, with its coils disposed along the link rotation axis. One end of the spring 230 is supported at the back side of the handle 212, while the other end of the spring 230 is supported at the intermediate link 224. The spring 230 is pre-loaded and biases the intermediate link 224 towards the handle 212.

Thus, in general, the handle assembly of the present disclosure is based on a complex movement of the handle with respect to the housing. There are two consecutive movements—a rotation and a rotation with translation. The fulcrum for the handle changes between the first and second phases of operation. The operation starts by depressing one end of the handle into the housing, which lifts the other end of the handle from the housing, providing access to the lifted edge, that can be used to actuate the subsequent movement. During the second phase, the slider is displaced, providing the actuating motion of the handle assembly.

Two variants are provided. In the first variant, the pressure has to be maintained at the end of the handle to keep the edge lifted from the housing. If the pressure is released before grabbing the edge of the handle, the handle will fall back into the housing. In the second variant, the handle stays depressed into the housing after removing the pressure from the edge, with the other edge lifted from the housing. As a result, it is possible to move the pressure from the handle before grabbing the lifted edge. During the final actuating movement of the handle, the studs are displaced from their retained positions. After releasing, the handle can fall back into its initial neutral position. The differences here are provided by the shape of the slot guiding the handle in the housing and the position of the handle fulcrum line for the second actuation phase of the movement.

Although the present disclosure is illustrated and described with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A low-profile handle assembly adapted for use in a hatch cover of a storage compartment of a vehicle, the handle assembly consisting of:
    a recessed housing comprising a plurality of sides, a top edge defining an opening, and a bottom, the recessed housing defining a longitudinal direction and an orthogonal vertical direction;
    a handle coupled to the recessed housing and disposed conformally within substantially the entirety of the opening defined by the top edge of the recessed housing;
    a translatable, extensible link assembly consisting of an intermediate link, a slider configured to be disposed in a longitudinal recess defined by the recessed housing and coupling the handle to the recessed housing, a first hinge pin forming a first pivot axis, and a second hinge pin forming a second pivot axis;
    a spring disposed about the first hinge pin pivotably coupling the handle to the intermediate link and adapted to bias the handle towards the link assembly; and
    a buffer member disposed between the handle and the intermediate link and configured to prevent rubbing or binding between the handle and the intermediate link,
    wherein the handle is adapted to pivot with respect to the recessed housing about the first pivot axis disposed at a first intermediate longitudinal location along the recessed housing and the handle, the intermediate link is adapted to pivot with respect to the recessed housing about the second pivot axis disposed at a second intermediate longitudinal location along the recessed housing and the handle, and the handle is adapted to pivot with respect to the recessed housing about a third pivot axis disposed at an end longitudinal location along the recessed housing and the handle, the first intermediate longitudinal location longitudinally positioned between the second intermediate longitudinal location and the end longitudinal location,
    wherein the first hinge pin pivotally couples the handle to the intermediate link, and the second hinge pin pivotally couples the intermediate link to the slider and passes through at least one hole or bore manufactured into the slider and through the longitudinal recess to dispose the slider within the longitudinal recess, the second hinge pin and longitudinal recess configured to allow longitudinal translation of the slider disposed within the longitudinal recess such that the slider translates parallel to the longitudinal direction; and
    wherein the handle is pivotably coupled to the recessed housing via a protruding pivot structure coupled to one end of the handle and adapted to be received within a slot structure defined by the recessed housing, thereby allowing the one end of the handle and the protruding pivot structure to translate vertically into the recessed housing and forming the third pivot axis that is translatable into the recessed housing.

2. The handle assembly of claim 1, wherein the bottom of the recess housing defines a bottom recess, and the slider includes a track structure that is adapted to translate within the bottom recess of the bottom of the recessed housing, thereby allowing the second pivot axis to translate within the recessed housing.

* * * * *